(12) United States Patent
Molé

(10) Patent No.: US 7,699,224 B2
(45) Date of Patent: Apr. 20, 2010

(54) DEVICE PROVIDED WITH MEANS FOR MAINTENANCE AGAINST A COMMUNICATION SURFACE OF A CONTACTLESS DATA MEDIUM

(75) Inventor: Julien Molé, Salins les Bains (FR)

(73) Assignee: Parkeon, Paris (FR)

( * ) Notice: Subject to any disclaimer, the term of this patent is extended or adjusted under 35 U.S.C. 154(b) by 750 days.

(21) Appl. No.: 10/547,662

(22) PCT Filed: Mar. 29, 2004

(86) PCT No.: PCT/FR2004/000796

§ 371 (c)(1),
(2), (4) Date: Oct. 30, 2006

(87) PCT Pub. No.: WO2004/090792

PCT Pub. Date: Oct. 21, 2004

(65) Prior Publication Data

US 2007/0080777 A1    Apr. 12, 2007

(30) Foreign Application Priority Data

Mar. 31, 2003   (FR) .................................. 03 04057

(51) Int. Cl.
*G06K 7/00* (2006.01)
(52) U.S. Cl. ....................... 235/439; 235/441
(58) Field of Classification Search ................ 235/439, 235/441, 443, 444
See application file for complete search history.

(56) References Cited

U.S. PATENT DOCUMENTS

| 5,221,838 | A | * | 6/1993 | Gutman et al. | ............... 235/379 |
| 5,563,393 | A | * | 10/1996 | Coutts | ........................ 235/379 |
| 5,748,737 | A | * | 5/1998 | Daggar | ........................ 705/41 |
| 2002/0062284 | A1 | * | 5/2002 | Kawan | ........................ 705/43 |

OTHER PUBLICATIONS

International Search Report—Sep. 28, 2004.

* cited by examiner

*Primary Examiner*—Daniel St.Cyr
(74) *Attorney, Agent, or Firm*—Young & Thompson

(57) ABSTRACT

The invention relates to a device (10) comprising a housing wherein a communication station is accommodated, said communication station comprising an inner antenna (12), wherein the housing comprises a wall (14) which has a transversal outer communication surface (16) which is generally vertical and which is fitted close to the inner antenna (12) and which is permeable in relation to electromagnetic waves, wherein the inner antenna (12) can communicate electromagnetically (E) in a remote manner with a data medium (18), more particularly in the form of a card, when a user places the data medium (18) against the outer communication surface (16), characterized in that the communication surface (16) comprises means (22) for maintaining the data medium (18) in a pressed position in relation to the communication surface (16).

12 Claims, 2 Drawing Sheets

DEVICE PROVIDED WITH MEANS FOR MAINTENANCE AGAINST A COMMUNICATION SURFACE OF A CONTACTLESS DATA MEDIUM

RELATED APPLICATIONS

The present application is a national phase application of PCT/FR2004/00796, which in turn claims the benefit of priority from French Patent Application No. 03 04057, filed on Mar. 31, 2003, the entirety of which are incorporated herein by reference.

FIELD OF THE INVENTION

The invention relates to a device comprising a housing wherein an inner antenna that is connected to a data processing device is accommodated.

SUMMARY

The invention relates more particularly to a device comprising a housing wherein a communication station comprising an inner antenna is accommodated and of the type wherein the housing comprises a wall which has a transversal outer communication surface which is generally vertical, close to the inner antenna and permeable to electromagnetic waves and wherein the inner antenna can communicate electromagnetically in a remote manner with a data medium, more particularly in the form of a card, when a user places the data medium against the outer communication surface.

BACKGROUND OF THE INVENTION

Certain devices, in particular automatic devices, are intended to be used by users possessing a specific data medium, for example an integrated circuit card.

In integrated circuit cards, a main body of the card, made from a plastics material, incorporates at least one electronic circuit, also called a microchip. Prior art cards with contactless integrated circuits, also known as transponders, include an antenna accommodated within the support card to enable the integrated circuit to communicate electromagnetically with the device.

The device comprises a communication station adapted to encrypt or decrypt data exchanged electromagnetically with the data medium. The station includes in particular an antenna for communicating with the data medium.

Because it includes vulnerable elements that may be damaged by external attack, the station is generally enclosed in a protective housing.

At least one wall of the housing includes a surface permeable to electromagnetic waves to allow communication between the data medium and the station. This surface is referred to as the communication surface in the remainder of this description.

Various standards define the type of card and the type of station to be used as a function of the maximum required communication distance between the card and the station. The present invention relates to devices of the type in which the data medium communicates with the station over a short distance (a few millimeters) and/or in the vicinity (at a distance of a few centimeters). The communication surface must therefore be situated in the vicinity of the inner antenna.

The communication surface is generally integrated into a card-receiving location. This receiving location is generally made obvious on the device to show the user where the communication surface onto which he must press the contactless card is located.

In one prior art design, devices using this type of card are equipped with a receiving location of the card reader type. The housing includes a slot, which is generally horizontal, into which the user inserts the card edge-on in order to carry out a transaction, for example to make a payment.

However, repeated contact of the card with the reader causes the card to become worn.

Moreover, the operation of inserting the card into the reader takes some time, because the user generally keeps his card in a protective case and/or in a wallet. He must therefore extract the card from its case and then insert it into the slot of the reader.

Furthermore, this type of receiving location is not suited to use "on the fly", where the user passes in front of the device without stopping, moving the card across the communication surface.

Finally, this kind of card reader is generally situated in a public place, and is therefore liable to be vandalized, for example by inserting chewing gum into the slot, which is then blocked.

Devices are also known in the art in which the receiving location is formed only by the communication surface, which is generally vertical, and against which the user presses his card. Thanks to this type of device, the user can use the card without taking it out of its case, and even without taking it out of his wallet. This type of receiving location is in particular very suitable for on the fly use.

However, this type of device is not suitable for prolonged use of the card. The user is obliged to hold the card pressed against the communication surface by hand throughout the transaction.

OBJECTS AND SUMMARY OF THE INVENTION

To solve the above problems, the invention proposes a device of the type described above that is characterized in that the communication surface comprises means for holding the data medium pressed against the communication surface.

According to other features of the invention:

the holding means have a lower transverse retaining surface that extends forward globally perpendicularly from the bottom of the communication surface to prevent the data medium sliding downward;

the communication surface has a transverse rim that extends longitudinally and perpendicularly from the communication surface and whose upper face forms the lower retaining surface;

the communication surface is slightly inclined relative to a vertical plane so that the data medium is held pressed against the communication surface by its own weight;

the holding means include two parallel lateral uprights that project from the communication surface and extend perpendicularly upward from each of the edges of the retaining surface, the uprights being spaced by a distance globally equal to a transverse dimension of the data medium to delimit, with the retaining surface, a receiving location intended to receive the data medium and encompassing at least a portion of the communication surface;

the device includes means for preventing objects significantly more bulky than the data medium from being placed on the retaining surface;

the retaining surface has a longitudinal width globally equal to the longitudinal thickness of the data medium;

the angle of inclination of the communication surface to the vertical direction is less than a limiting angle so that an object whose center of gravity is substantially offset longitudinally forward relative to the center of gravity of the data medium tilts relative to the retaining surface;

the retaining surface includes means for evacuating liquids liable to flow from the communication surface as far as the retaining surface;

the retaining surface has liquid evacuation orifices at least at its edges;

the retaining surface has a transverse declivity to encourage the flow of liquid toward the evacuation orifices;

the retaining surface is formed by at least two lugs that extend perpendicularly forward from the communication surface.

BRIEF DESCRIPTION OF THE DRAWINGS

Other features and advantages of the invention will become apparent in the course of reading the following detailed description, for an understanding of which refer to the appended drawings, in which.

DETAILED DESCRIPTION

Figure 1:
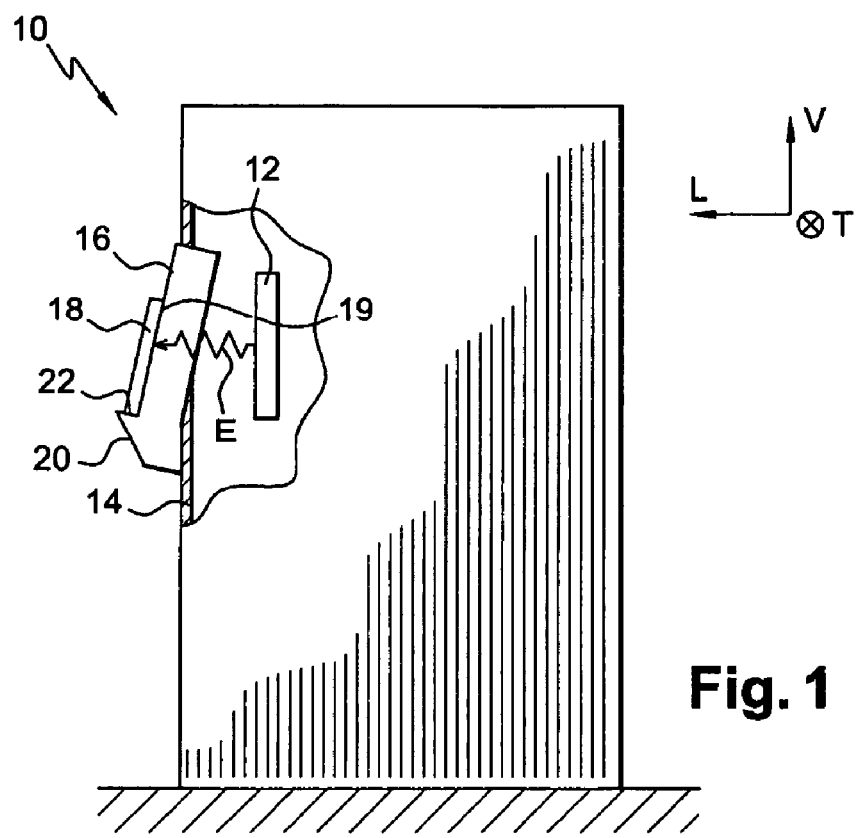
FIG. 1 is a side view representing diagrammatically a device that is equipped with an inner antenna and which includes means conforming to the teachings of the invention for holding a data medium pressed against a communication surface.

The remainder of the description relates to longitudinal, vertical and transverse orientations indicated by the orthogonal axes L, V, T in FIG. 1.

FIG. 1 shows a transaction device 10. The device 10 takes the general form of a housing that accommodates an antenna 12 of a communication station (not shown).

The device 10 has a vertical transverse front wall 14. The front wall 14 here has an exterior communication surface 16 facing and in the vicinity of the inner antenna 12. The communication surface 16 is transverse and globally vertical.

A data medium 18 in the form of a card is intended to have its rear face 19 pressed against the communication surface 16 by the user. The data medium 18 is an integrated circuit card, for example, and includes means for remote electromagnetic communication with the inner antenna 12. The electromagnetic communication is indicated in FIG. 1 by the arrow E.

Here the data medium 18 has a thickness in the longitudinal direction that is small relative to its transverse width and its vertical height.

It is to be understood that in the remainder of the description the term "data medium" applies to a microchip card, a ticket or any other medium of similar dimensions. The expression "data medium 18" encompasses also a case containing the card type medium, which may be a pocket with similar dimensions to the card or a wallet in which the card is kept.

The communication surface 16 is permeable to the electromagnetic waves E and is in the vicinity of the inner antenna 12 so that it is in the range of the inner antenna 12, i.e. so that:

the inner antenna 12 can emit electromagnetic waves E that reach the communication surface 16, and the inner antenna 12 can pick up electromagnetic waves E that are emitted by the data medium 18 pressed against the communication surface 16.

According to the teachings of the invention, the communication surface 16 is part of a receiving location for the data medium 18 that includes means for holding the card 18 pressed against the communication surface 16 without intervention by the user.

The communication surface 16 has a transverse lower rim 20 that extends longitudinally toward the front. The rim 20 has an upper face 22 that forms a lower retaining surface intended to retain the data medium 18 vertically in order to prevent it sliding downward. The retaining surface 22 is globally perpendicular to the communication surface 16. The retaining surface 22 is adapted to support a transverse lower edge 23 of the data medium 18.

The retaining surface 22 has a maximum longitudinal width globally equal to the thickness of the data medium 18. The width of the retaining surface 22 is sufficient to prevent the data medium 18 sliding downward or tipping forward.

Figure 2:
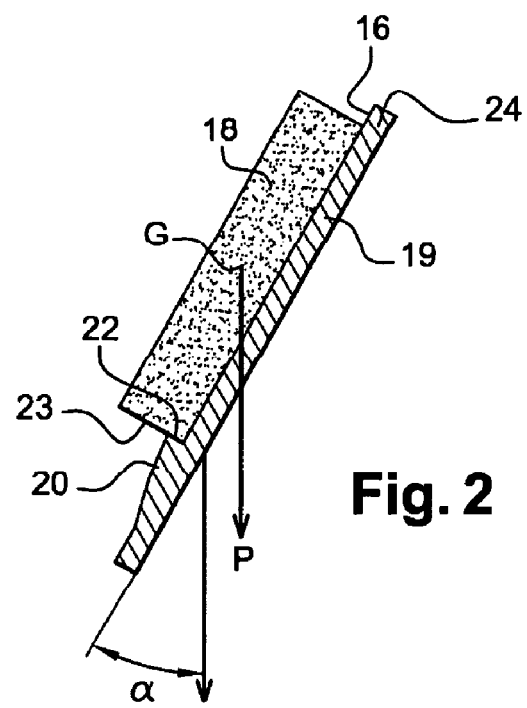
FIG. 2 is a view in section taken along the line 2-2 in FIG. 3 and represents the communication surface equipped with the holding means from FIG. 1.

As shown in FIG. 2, the communication surface 16 is inclined at an angle α to the vertical direction so that the lower edge 20 of the communication surface 16 is longitudinally in front of an upper edge 24 thereof. Accordingly, the rear face 19 of the data medium 18 is held pressed against the communication surface 16 by its own weight.

Figure 3:
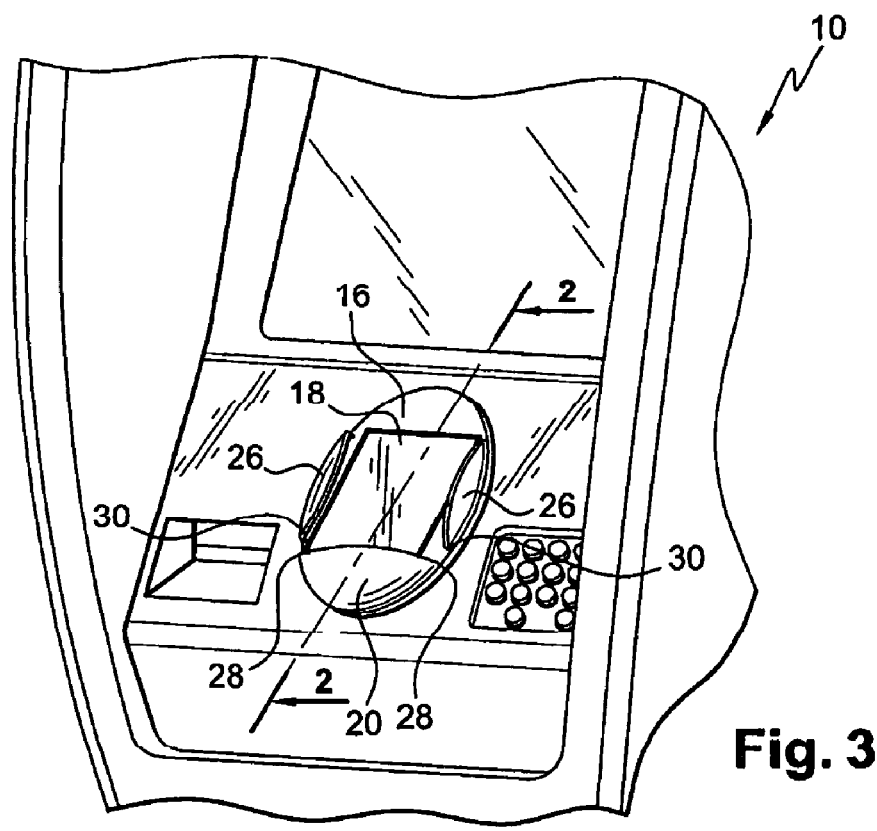
FIG. 3 is a perspective view of the FIG. 1 device.

As shown in FIG. 3, the communication surface 16 includes two vertical uprights 26 that project forward. The uprights 26 are parallel to each other and extend upward substantially from the edges 28 of the retaining surface 22.

The uprights 26 and the retaining surface 22 surround the receiving location of the communication surface 16 that is intended to receive the data medium 18. The uprights 26 have a depth in the longitudinal direction that is large enough to maintain the data medium 18 transversely and small enough not to constitute an obstacle to the data medium 18 during an on the fly passage of the data medium 18 along a globally transverse trajectory.

The edges 28 of the retaining surface 22 and the lower edges 30 of each upright 26 are advantageously not joined together, so as to form orifices for evacuating liquid. Accordingly, if a liquid is retained by the retaining surface 22, it is easier to expel it by sweeping it transversely toward one of the edges through which the liquid can flow.

The transverse outside edge of the retaining surface 22 has a rounded shape with no sharp corners to facilitate cleaning of the device, for example by wiping it with a cloth.

In a variant that is not shown, the retaining surface 22 has a slight transverse declivity toward one or both of its edges 28 so that retained liquid flows by gravity toward the edges 28.

In another variant that is not shown, the communication surface 16 is slightly domed at the intersection with the retaining surface 22 so that retained liquid flows by gravity toward the edges 28.

In a further variant that is not shown, the retaining surface 22 includes a transverse gutter situated at the intersection with the communication surface 16. The liquid therefore flows along the gutter to the edges 28.

In a further embodiment that is not shown, the rim 20 includes substantially vertical channels whereof an upper orifice opens onto the retaining surface 22 and the lower end discharges to the outside of the device.

In a first embodiment, the communication surface 16 is a separate part that is fixed to the front wall 14 of the device 10. The uprights 26 and the rim 20 are formed in one piece with the communication surface 16.

In a second embodiment, the uprights 26 and/or the lower rim 20 are formed in one piece with the front wall 14 and the communication surface 16 is an attached part.

When using the device 10, the user places the edge 23 of the data medium 18 on the retaining surface 22. As shown in FIG. 2, the center of gravity G of the data medium 18 is longitudinally to the rear of the retaining surface 22. Accordingly, the weight P of the data medium 18 presses its rear face 19 against the communication surface 16.

Figure 4:
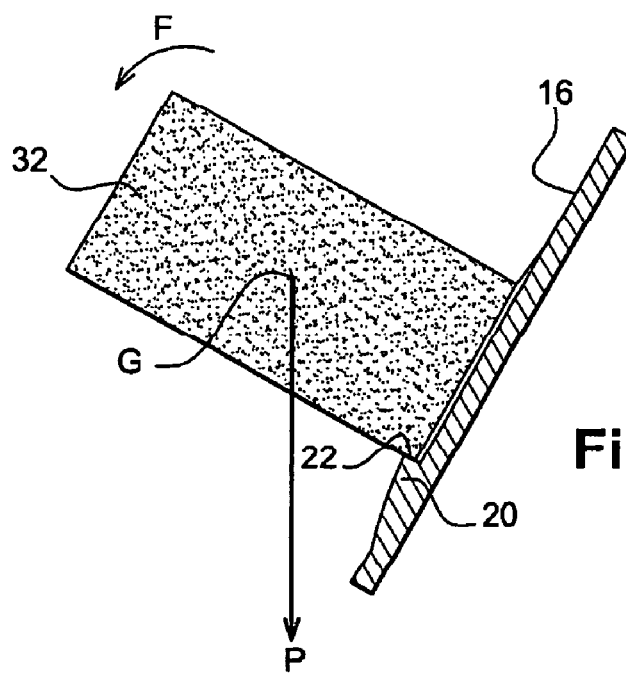
FIG. 4 is a view similar to that of FIG. 2 showing the communication surface with an object that is more bulky than the data medium placed thereon.

As shown in FIG. 4, the width of the retaining surface 22 and the angle α of inclination of the communication surface 16 are such that an object 32 whose longitudinal thickness is significantly greater than the thickness of the data medium 18 tilts forward relative to the retaining surface 22. The center of gravity G of the object 32 is longitudinally forward of the retaining surface 22. The object 32 is therefore caused to rotate by its own weight P, in the direction of the arrow F, so as to fall off the device 10.

Moreover, an object having a transverse dimension significantly greater than that of the data medium 18 cannot be placed on the retaining surface 22. The uprights 26 prevent access to the retaining surface 22 for this kind of object.

In a variant that is not shown, the retaining surface 22 is formed by at least two lugs that extend perpendicularly forward from the communication surface 16. The lugs are transversely aligned with the bottom of the communication surface 16. The lugs are spaced transversely by a distance less than the transverse width of the data medium 18.

Thus a liquid that flows off the communication surface 16 is not retained by the retaining surface 22. The liquid is evacuated between the lugs. Moreover, this kind of retaining surface 22 prevents small objects such as tissue paper, etc. from being placed on top.

The invention claimed is:

1. Device comprising:
a housing wherein is accommodated a radio-frequency contactless communication station having an antenna for communicating electromagnetically in a remote manner with a data medium, in the form of a card, carried by a user, said housing having a communication area close to the antenna which is permeable to electromagnetic waves, the user being required to bring the data medium close to the communication area to enable communication between the station and said medium, wherein the communication area comprises an external surface inclined to a horizontal plane, said communication surface cooperating with an arrangement for holding the data medium against the communication surface, wherein said arrangement for holding the data medium has a lower transverse retaining surface that extends forward from the communication surface to prevent the data medium from sliding downward, said arrangement for holding data medium further includes provision for evacuating liquids via gravity.

2. Device according to claim 1, wherein the communication surface cooperates with a transverse rim that extends longitudinally and perpendicularly from the communication surface and whose upper face forms the lower retaining surface.

3. Device according to claim 1, wherein the communication surface is slightly inclined relative to a vertical plane so that the data medium is held pressed against the communication surface by its own weight (P).

4. Device according to claim 1, wherein the arrangement for holding the data medium includes two parallel lateral uprights that project from the communication surface and extend perpendicularly upward from each of the edges of the retaining surface, the uprights being spaced by a distance substantially equal to a transverse dimension of the data medium to delimit, with the retaining surface, a receiving location intended to receive the data medium and encompassing at least a portion of the communication surface.

5. Device according to claim 1, wherein said device includes an arrangement for preventing objects significantly more bulky than the data medium from being placed on the retaining surface.

6. Device according to claim 5, wherein the angle (α) of inclination of the communication surface to the vertical direction is less than a limiting angle so that an object whose center of gravity (G) is substantially offset longitudinally forward relative to the center of gravity (G) of the data medium tilts relative to the retaining surface.

7. Device according to claim 1, wherein the retaining surface has a longitudinal width substantially equal to the longitudinal thickness of the data medium.

8. Device according to claim 1, wherein the retaining surface has liquid evacuation orifices at least at its edges.

9. Device according to claim 8, wherein the retaining surface has a transverse declivity to encourage the flow of liquid toward the evacuation orifices.

10. Device according to claim 8, wherein the arrangement for evacuating liquids comprises the communication surface being domed at the intersection with the retaining surface so that liquid can flow by gravity toward the evacuation orifices.

11. Device according to claim 1, wherein the retaining surface is formed by at least two lugs that extend perpendicularly forward from the communication surface wherein the arrangement for evacuating liquids comprises the lugs being placed transversely by a distance.

12. Device according to claim 1, wherein the arrangement for evacuating liquids comprises channels through the arrangement for holding the data medium, wherein an upper orifice and a lower end discharges to the outside of the device.

\* \* \* \* \*